(12) United States Patent
Gusev et al.

(10) Patent No.: US 11,544,162 B2
(45) Date of Patent: Jan. 3, 2023

(54) COMPUTER CLUSTER USING EXPIRING RECOVERY RULES

(71) Applicant: Oracle International Corporation, Redwood Shores, CA (US)

(72) Inventors: Andrey Gusev, Dublin, CA (US); Tak Wang, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/547,874

(22) Filed: Dec. 10, 2021

(65) Prior Publication Data

US 2022/0100619 A1 Mar. 31, 2022

Related U.S. Application Data

(63) Continuation of application No. 16/917,360, filed on Jun. 30, 2020, now Pat. No. 11,210,187.

(51) Int. Cl.
*G06F 11/00* (2006.01)
*G06F 11/20* (2006.01)
*G06F 11/14* (2006.01)

(52) U.S. Cl.
CPC ...... *G06F 11/2028* (2013.01); *G06F 11/1425* (2013.01); *G06F 11/2023* (2013.01); *G06F 2201/805* (2013.01)

(58) Field of Classification Search
CPC ............ H04L 41/0816; G06F 11/1425; G06F 11/2023; G06F 11/2028; G06F 11/2046
See application file for complete search history.

(56) References Cited

U.S. PATENT DOCUMENTS

| | | | | |
|---|---|---|---|---|
| 9,485,163 | B1* | 11/2016 | Fries | G06F 11/2038 |
| 10,747,635 | B1* | 8/2020 | Trachtman | G06F 11/0793 |
| 2003/0159084 | A1 | 8/2003 | Murphy et al. | |
| 2007/0016822 | A1 | 1/2007 | Rao et al. | |
| 2008/0184061 | A1* | 7/2008 | Tripathi | G06F 11/1482 714/4.1 |
| 2011/0252270 | A1* | 10/2011 | Abraham | G06F 11/1425 709/221 |
| 2012/0198455 | A1* | 8/2012 | Lee | G06F 11/1425 718/100 |

FOREIGN PATENT DOCUMENTS

EP 1117039 B1 * 2/2010 ............ G06F 11/203

* cited by examiner

*Primary Examiner* — Michael Maskulinski
(74) *Attorney, Agent, or Firm* — Trellis IP Law Group, PC; Lisa Benado

(57) ABSTRACT

The fail-over computer cluster enables multiple computing devices to operate using adaptive quorum rules to dictate which nodes are in the fail-over cluster at any given time. The adaptive quorum rules provide requirements for communications between nodes and connections with voting file systems. The adaptive quorum rules include particular recovery rules for unplanned changes in node configuration, such as due to a disruptive event. Such recovery quorum rules enable the fail-over cluster to continuing to operate with various changed configurations of its node members as a result of the disruptive event. In the changed configuration, access to voting file systems may not be required for a majority-group subset of nodes. If no majority-group subset remains, nodes may need direct or indirect access to voting file systems.

20 Claims, 9 Drawing Sheets

COMPUTER CLUSTER USING EXPIRING RECOVERY RULES

CROSS REFERENCES TO RELATED APPLICATIONS

This application is a continuation of the following application. U.S. patent application Ser. No. 16/917,360, entitled COMPUTER CLUSTER WITH ADAPTIVE QUORUM RULES, filed on Jun. 30, 2020, which is hereby incorporated by reference as if set forth in full in this application for all purposes.

BACKGROUND

When multiple computers need to coordinate in working together, computer clusters can be formed. In computer clusters, computer memberships are defined to specify which computers members, referred to as nodes, are in the cluster. To form and operate a cluster, nodes are defined by way of a quorum. Cluster members agree on rules to derive a quorum. Quorum rules specify which nodes are active at any given time to participate in the cluster, e.g. run applications, access a database, etc. Quorum rules may also be applied if communications between nodes fail.

In some approaches, there is exactly one definition of which computers the cluster is comprised of (there are never multiple answers to this question no matter which node is asked.). The designation of which nodes are in the cluster according to the quorum rules is uniform among all nodes of the cluster. All of the nodes of a cluster are consistent in implementing the set of rules to derive the quorum. Changes to the cluster membership, e.g. addition/and removal of members, must be uniformly known, agreed to, and understood by all computer nodes in the cluster. If a node goes offline, all remaining node members are aware of it. Likewise, if there's a network partition that leaves some node members of the cluster on unreachable parts of the network, at most one subset of the old cluster may end up remaining and claiming to the be "the cluster" thereafter.

Some cluster memberships are managed based on consistent node membership staying above half of a designated cluster size. For example, the number of node members that are online and able to communicate with each other is half the cluster size plus one node, at all times, or the cluster fails. The cluster size can be defined as the number of computers predefined and stored in a persistent storage (the static way) or the number of computers that were online in a healthy cluster at some point in time (the dynamic way). For example, if a cluster is configured to have 5 nodes, it can go and stay online so long as at least 3 computers are a part of it. If the number of online members falls below 3, the cluster goes offline.

Other clusters employ membership management based on all nodes having consistent direct access to voting files. Voting files may be placed on shared storage (SAN/Infiniband/NFS/etc) so they are accessible to all cluster nodes. A node has a right to remain in the cluster so long as it's able to directly access the voting files. If it loses that access, it must leave (be evicted) from the cluster. A voting file outage can take down the cluster when all nodes are otherwise healthy, online, and can communicate with each other.

Typically, cluster nodes employ one or more "heart-beat" mechanisms to confirm aliveness of/detect problems with other nodes. They normally do so over one or more interconnect networks. Each node of a cluster sends a unicast heartbeat signal to every other node in the cluster at regular intervals. The heartbeat signal may be monitored by each receiving node to confirm liveness of its peers and signify problems with the nodes. If a heartbeat signal is not received from a node, then that node is considered offline.

Occasionally, events happen that change the nodes of a cluster, such as a new node joining or leaving a cluster. Through quorum rules, changes to the cluster membership is uniformly known, agreed to, and understood by all nodes in the cluster.

Problems can arise when there is an unplanned stoppage of communication between one or more nodes or other interruption of node operations. Such failures may be sudden and unintentional due to disruptive events, e.g. power outages, hardware breakdowns, such as glitches in small computer system interface (SCSI) devices, operating system malfunctions, etc. At times, such failures can result in quorum rule violations that can lead to total cluster outage. Fault tolerance from such disruptive events is important for the continued operation of the computer cluster. A failover process includes quorum rules that determine which remaining nodes may suffice for the cluster to remain operational.

SUMMARY

Implementations of this application relate to a fail-over computer cluster using recovery quorum rules that are flexible to allow for altered node configurations due to disruptive events. The fail-over computer cluster is permitted to continue operations with various arrangements of a subset of node members as a result of the disruptive event.

In some implementations, a computer-implemented method is provided to operate a computer cluster having a plurality of nodes according to quorum rules. The method includes determining a failure status of at least one of the plurality of nodes of the computer cluster, in response to a disruptive event. The computer cluster is maintained with a survived subset of remaining nodes that complies with recovery quorum rules. The recovery quorum rules are stored in the one or more voting file systems.

Each of the remaining nodes of the survived subset complies with at least one of the recovery quorum rules for voting file access. The recovery quorum rules specify a surviving subset complies with certain requirements. The requirements include that the remaining nodes of the survived subset are a majority-group of initial nodes that operates in the computer cluster prior to the disruptive event, and if there is no subset having a majority-group of remaining nodes, the survived subset may be a subset of the remaining nodes that has direct access with at least a majority of the one or more voting file systems. If a node in the survived subset does not have direct access to the voting file systems, the node may have indirect access by being in communication with a coordinator node of the remaining nodes that has direct access with at least a majority of the one or more voting file systems.

Prior to the disruptive event, the computer cluster may operate according to formation quorum rules in which each of the initial node is further in communication with at least a majority of one or more voting file systems. In some aspects, the recovery quorum rules further comprise an expiration time, after which the quorum rules apply instead of the recovery quorum rules.

In some implementations, when a plurality of subsets complies with the recovery quorum rules for voting file access, a particular subset of the plurality of subsets may be identified as the survived subset for maintaining the computer cluster, based, at least in part, on one or more selection factors. The selection factors may include a greatest number of remaining nodes being in the particular subset than remaining nodes of other subsets. Selection factors may also include a highest or lowest total assigned identification number for the particular subset, than total assigned identification numbers of other subsets. Selection factors may include a greatest number of remaining nodes associated with priority tasks. Another selection factor includes at least one remaining node in the particular subset is pre-designated as an essential node. In some implementations, a selection score may be determined for each of the plurality of subsets based on two or more selection factors satisfied by the each one of the plurality of subsets.

Various implementations and examples of the method are described. For example, in some implementations, the remaining nodes of the survived subset may include half or less than half of the initial nodes. A workload from a failed node may be reassigned to one or more of the remaining nodes of the survived subset.

In yet some implementations, an apparatus to operate a computer cluster having a plurality of nodes according to quorum rules, is provided that comprises one or more processors and logic encoded in one or more non-transitory media for execution by the one or more processors and when executed operable to perform operations to apply quorum rules to a computer cluster. The operations include determining a failure status of at least one of the plurality of nodes of the computer cluster, in response to a disruptive event. The computer cluster is maintained with a survived subset of remaining nodes that complies with one of recovery quorum rules stored in the one or more voting file systems. The recovery quorum rules specify that a subset having remaining nodes that are a majority-group of the initial nodes that operates in the computer cluster prior to the disruptive event, may be a surviving subset. When there is no subset having a majority-group of remaining nodes, the survived subset may be a subset that includes remaining nodes with either (1) direct access with at least a majority of the one or more voting file systems, or (2) are in communication with a coordinator node of the remaining nodes that has direct access with at least a majority of the one or more voting file systems.

Various implementations and examples of the operations of the logic executed by the one or more processors are described. For example, prior to the disruptive event, the computer cluster may be operated according to formation quorum rules in which each of the initial node is further in communication with at least a majority of one or more voting file systems. In some implementations of the apparatus, the recovery quorum rules may further comprise an expiration time, after which the quorum rules apply instead of the recovery quorum rules.

In some implementations, the one or more processors executing the logic is operable to perform additional operations. For example, when a plurality of subsets complies with the recovery quorum rules for voting file access, operations may include identifying a particular subset of the plurality of subsets as the survived subset for maintaining the computer cluster, based, at least in part, on one or more selection factors. As with the method described above, the selection factors may include a greatest number of remaining nodes being in the particular subset than remaining nodes of other subsets. Selection factors may also include a highest or lowest total assigned identification number for the particular subset, than total assigned identification numbers of other subsets. Selection factors may include a greatest number of remaining nodes associated with priority tasks. Another selection factor includes at least one remaining node in the particular subset is pre-designated as an essential node. In some implementations, a selection score may be determined for each of the plurality of subsets based on two or more selection factors satisfied by the each one of the plurality of subsets. In some implementations, the remaining nodes of the survived subset may include half or less than half of the initial nodes.

In still some implementations, non-transitory computer-readable storage medium is provided that carries program instructions thereon to operate a computer cluster having a plurality of nodes according to quorum rules. The instructions when executed by one or more processors cause the one or more processors to perform operations. The operations include determining a failure status of at least one of the plurality of nodes of the computer cluster, in response to occurrence of a disruptive event. The computer cluster is maintained with a survived subset of remaining nodes, according to recovery quorum rules stored in the one or more voting file systems. The recovery quorum rules specify that a subset having remaining nodes that are a majority-group of the initial nodes may be a surviving subset. When there is no subset having a majority-group of remaining nodes, the survived subset may be a subset that includes remaining nodes with either (1) direct access with at least a majority of the one or more voting file systems, or (2) are in communication with a coordinator node of the remaining nodes that has direct access with at least a majority of the one or more voting file systems.

Various implementations and examples of the instructions executed by one or more processors are described. For example, prior to the disruptive event, the computer cluster may be operated according to formation quorum rules in which each of the initial node is further in communication with at least a majority of one or more voting file systems. In some implementations of the apparatus, the recovery quorum rules may further comprise an expiration time, after which the quorum rules apply instead of the recovery quorum rules.

In some implementations, the one or more processors executing the instructions is operable to perform additional operations. For example, when a plurality of subsets complies with the recovery quorum rules for voting file access, operations may include identifying a particular subset of the plurality of subsets as the survived subset for maintaining the computer cluster, based, at least in part, on one or more selection factors. As with the method described above, the selection factors may include a greatest number of remaining nodes being in the particular subset than remaining nodes of other subsets. Selection factors may also include a highest or lowest total assigned identification number for the particular subset, than total assigned identification numbers of other subsets. Selection factors may include a greatest number of remaining nodes associated with priority tasks. Another selection factor includes at least one remaining node in the particular subset is pre-designated as an essential node. In some implementations, a selection score may be determined for each of the plurality of subsets based on two or more selection factors satisfied by the each one of the plurality of subsets. In some implementations, the remaining nodes of the survived subset may include half or less than half of the initial nodes.

A further understanding of the nature and the advantages of particular embodiments disclosed herein may be realized by reference of the remaining portions of the specification and the attached drawings.

BRIEF DESCRIPTION OF THE DRAWINGS

The disclosure is illustrated by way of example, and not by way of limitation in the figures in which like reference numerals are used to refer to similar elements.

FIGS. 2a, 2b, and 2c are a block diagrams of an exemplary fail-over cluster having five nodes and three voting file systems, in which FIG. 2a shows a node configuration prior to a disruptive event, 2b shows one node configuration after a disruptive event in which recovery quorum rules may be applied, and 2c shows another node configuration after a disruptive event in which recovery quorum rules may be applied, in accordance with some implementations.

FIG. 3a, 3b are a block diagrams of an exemplary fail-over cluster having four nodes and three voting file systems, in which FIG. 3a shows a node configuration prior to a disruptive event, 3b shows one node configuration after the disruptive event, in accordance with some implementations.

DETAILED DESCRIPTION OF EMBODIMENTS

Figure 1:
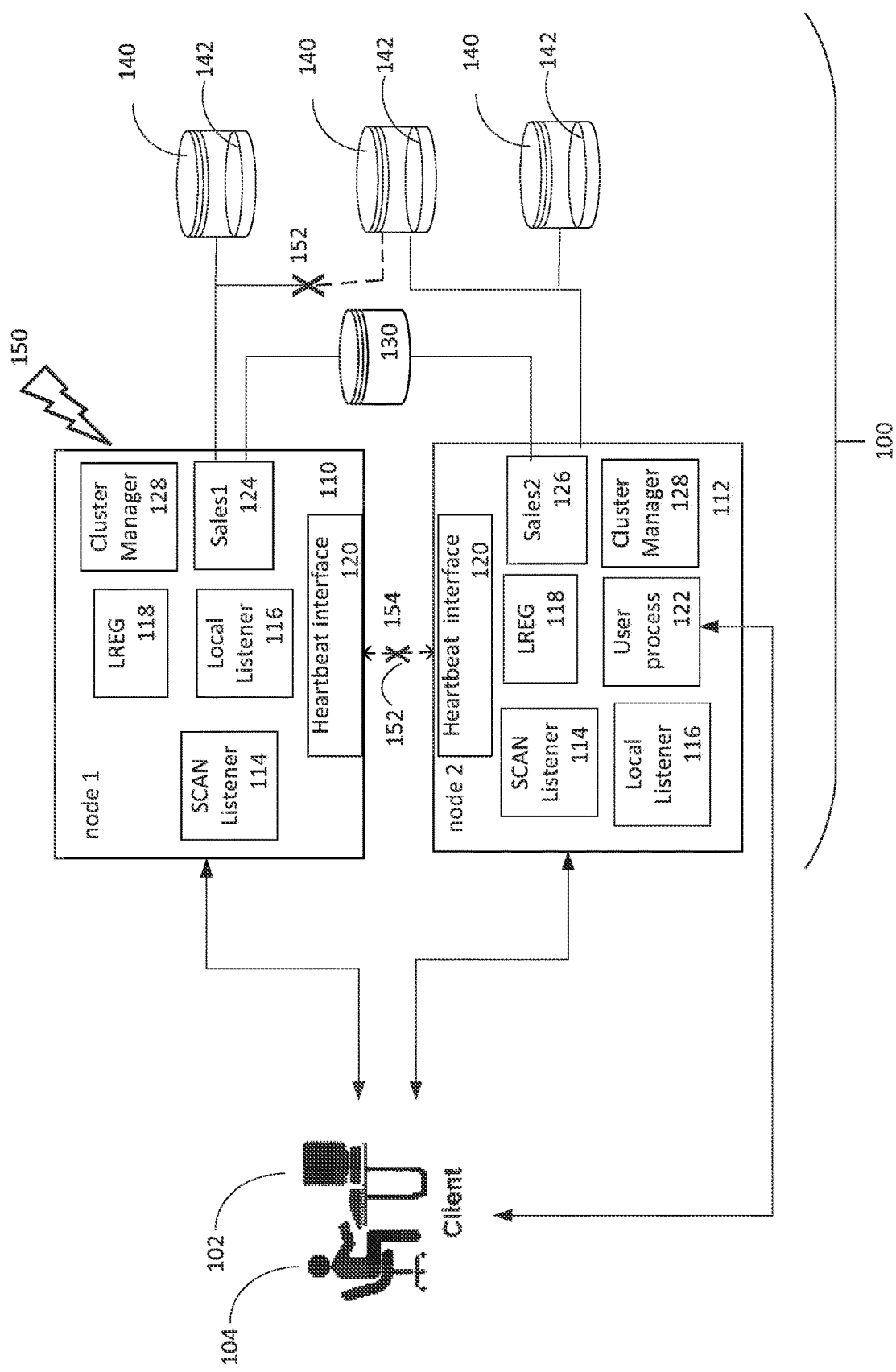
FIG. 1 is a conceptual diagram illustrating an example environment in which various aspects of a fail-over computer cluster can be implemented, in accordance with some implementations.

The present fail-over computer cluster enables multiple computing devices to operate using adaptive quorum rules to dictate which nodes are in the fail-over cluster at any given time. The adaptive quorum rules provide requirements for communications between nodes and connections with voting file systems, in order for the nodes to be recognized members of the fail-over cluster. The adaptive quorum rules include specific recovery rules for unplanned changes in node configuration, such as due to a disruptive event. The recovery quorum rules enable a fail-over cluster to continue operating in various changed arrangements of a subset of node members. Also provided are different rules that apply at the time of formation, such as at cluster creation and/or joining of a new node to an existing fail-over cluster.

Computer devices, e.g. servers, which intercommunicate via the fail-over cluster, are referred to as nodes herein. The nodes of the fail-over cluster may coordinate with one another to perform services. For example, nodes may have node database instances (e.g., background processes that operate on stored data and shared allocated memory used to do work) running on each and may access a shared database residing on disk. In this example, all of the nodes may concurrently execute transactions against files, such as data manipulations, in the same database. The fail-over cluster may unite processing power of each node to become an efficient, robust computing environment by dividing large tasks into subtasks, distributing subtasks among multiple nodes, and flexibly resolving node failures.

The fail-over cluster may operate with any number of nodes greater than one, such as two to twelve nodes or two to sixteen nodes. For example, a fail-over cluster may have two nodes, four nodes, eight nodes, etc.

Voting file systems are shared storage devices, e.g. servers that store voting files, such as disks. Voting files manage information about node membership that includes the adaptive quorum rule algorithms. Nodes access the adaptive quorum rules in the voting files of voting file systems to manage the information about node memberships. Each voting file system maintains duplicates of the voting files. For purposes of this description, the term "voting files" may be used to refer to "voting file systems." Any number of voting files may be employed, for example one voting file may be configured for the fail-over cluster, or multiple voting files may be used to create a high redundancy, such as 3-9 voting files, or 3-5 voting files. In some implementations, there is an odd number of voting files. Some types of voting files that may be implemented in the present fail-over cluster, for example, are described with regards to Oracle® Clusterware, Administration and Deployment Guide, 12c Release 2 (12.2), E85822_02 (June 2017), "Managing Oracle Cluster Registry and Voting Files," Section 6.2, pages 210-216, which is incorporated by reference herein. However, any presently known or future voting files for storage node membership information for computer clusters, can be adapted for use with the present fail-over cluster.

For the purposes of the present discussion, a disruptive event may be any incident that results in an unintentional failure of more than one node in a computer cluster. Such failures may be lack of a heartbeat from one or more nodes, in which certain nodes are unavailable. In some implementations, the failure may occur over a defined period of time. For example, the node failure may be sequential or cascading in occurrence, such as within minutes apart. In some implementations, the disruptive event may result in one or more groups of nodes failing at the same time. For example, a group of nodes may be in individual racks and one rack of nodes may fail, such as by a power outage. There may be loss of communication between certain racks. Groups of nodes may also fail substantially close in time, e.g. within seconds, such as 30 seconds to other node failures.

Adaptive quorum rules define various rules, such as recovery quorum rules that specify requirements to be applied in the case of a disruptive event, and formation rules for a running set of nodes in a cluster prior to an occurrence of any disruptive events. In some implementations, the computer cluster applies formation quorum rules during a "steady-state" of the computer cluster, e.g. at formation or prior to a disruptive event. The fail-over cluster, upon detection of a disruptive event and/or failure of nodes, is triggered to automatically switch to recovery quorum rules. The recovery quorum rules may be different than the formation quorum rules. Thus, the term "fail-over cluster" indicates that the cluster is flexibly prepared to apply the appropriate set of adaptive quorum rules as described herein, for a given situation, such as failure of nodes due to a disruptive event, administrative intervention, e.g. maintenance/repair of nodes, and steady-state operation of the cluster, etc.

Formation quorum rules specify which initial nodes are acceptable members of the cluster at the creation of the cluster and whether a new node is accepted to join an existing cluster. The formation quorum rules provide policies for communication among nodes and access to one or more of the voting file systems. The formation quorum rules may require that during normal operations, a node must be in communication with each of the other nodes of the fail-over cluster. The formation quorum rules may also provide that an initial node needs to have direct access to a majority of voting file systems shared by the given cluster.

For direct access, the node sends and receives information to/from a voting file system without an intermediary node relaying the information.

In some implementations, there may be additional formation quorum rules and variations of internode communications and voting file system access. For example, in some implementations, initial nodes at formation of the cluster may be required to access all of the voting file systems, rather than a majority of the voting file systems. In cluster configurations that include a single voting file system, direct access to the voting file system is required and a majority access rule would not apply.

In some situations, formation quorum rules alone may lack the flexibility to deal with unplanned node failures. When nodes in a cluster unexpectedly fail, the remaining nodes may take on a variety of configurations with different groups of the initial (preexisting) nodes. Some previous quorum rules that apply at formation alone may be too stringent in assessing viability of any remaining nodes in the cluster to deal with disruptive events. As a consequence, an otherwise viable cluster may be disbanded.

For purposes of this description of a fail-over cluster, failed nodes are unable to communicate with other nodes and/or shared storage, e.g. voting file systems, in a manner required for successful operation of the cluster, due to an unplanned happening. Remaining nodes ensuing from the disruptive event may maintain communication with one or more other remaining nodes. Groups of remaining nodes that communicate with each other are considered subsets. The recovery quorum rules address whether remaining nodes in various subsets have sufficient connections to voting file systems to continue as a member of the cluster.

Subsets are any grouping of one or more nodes that occurs as a result of a disruptive event in which one or more nodes fail to communicate a heartbeat signals to other nodes, but some nodes within a given subset continue sending heartbeat signals. The arrangement of heartbeat signals may be altered within a subset. For example, some nodes within a subset may be able to communicate and stay connected through intermediary nodes. Nodes within a subset communicate (e.g., send and receive) heartbeat signals to other nodes within the respective subset (directly or indirectly), but may be unable to send or receive heartbeat signals to/from other subsets of nodes.

The recovery quorum rules are different from formation rules to permit various configurations of a subset of remaining nodes. The recovery rules enable cluster operation to be maintained under certain circumstances: (1) a subset of remaining nodes include a majority of the initial nodes, then this majority-group of nodes become a survived subset to continue the cluster, and (2) if there is not a subset with a majority-group of nodes from the initial nodes, a subset is continued if all its remaining nodes have direct access or indirect access to a majority of voting file systems.

Due to the disruptive event, a newly formed role of a coordinator node is assumed in a subset of less than a majority-group of nodes (e.g. half or less than half of the initial nodes), in which the coordinator node has direct access to the majority of voting file systems and may relay data to particular other nodes of its subset, as needed. Through direct communication with one or more coordinator nodes, other remaining nodes in the less than majority-group subset that lack direct access to the prescribed voting files, may continue in the fail-over cluster. The recovery quorum rules for access to voting file systems for a subset that is less than a majority-group, provide that the subset may be maintained if each remaining nodes that do not have direct access to a majority of the voting file system, is in communication with a coordinator node that has access to at least a majority of the one or more voting file systems. There is no voting file access requirements for a majority-group subset.

In some implementations, for a subset that has less than a majority-group of nodes, a particular node that lacks direct access to voting file systems needs to be in direct communication with a coordinator node, without any intermediary nodes between the particular node and the coordinator node.

In some implementations, a remote node in a less than majority-group subset that lacks direct communication with a coordinator node, may continue in the fail-over cluster by indirectly communicating with a coordinator node through an intermediary cohort node. The intermediary cohort node may directly communicate with the coordinator node. In this implementation, the intermediary cohort node may receive information from the voting file system through the coordinator node and relay the information to the remote node. Likewise, the intermediary cohort node may receive information from the remote node and convey the information to the coordinator node for sending to the voting file system.

In some implementation, the recovery quorum rules further include tie-breaker rules that use selection factors in the case that remaining nodes are partitioned into more than one subset and more than one of the subsets meet the recovery quorum rules. For example, in the case that there are two subsets with equal numbers of nodes, the tie-breaker rules may apply to determine which of the two subsets continue in the cluster.

In situations after a disruptive event in which there is a majority-group subset in which the remaining nodes in the subset are more than half of the initial nodes, the recovery quorum rules include a preference rule to continuing the majority-group subset in the fail-over cluster. The preference rule serves as a temporary exception to voting file access rules to enable a majority-group subset to continue without accounting for any access to any voting files. For example, where a majority of the initial nodes remain after a disruptive event, the majority-group maintains the fail-over cluster even if none of the remaining nodes have access to any voting files, or if there is some access but the access would not satisfy the voting file access rules under typical situations.

In some implementations, the preference rule may provide an expiration time to the exception to voting file access rules. The preference rule may include the expiration time as to how long the majority of nodes can continue without satisfying the voting file access rules. The expiration time may be based on a time required to address the disruptions, e.g., repair node failures and/or lost access to voting files. For example the expiration time may be based on a time required for rebooting the failed nodes by an administrator, e.g. 5 to 30 minutes, or 10 minutes. The expiration time may be preset and uniformly followed by all nodes. During the expiration time period, the majority may continue the cluster and the other nodes, such as nodes in a minority subset, may be prevented from rejoining the cluster.

After the expiration time period, the previously running quorum rules, e.g. formation quorum rules, may reapply instead of the recovery quorum rules. For example, after the expiration time period, all nodes may be required to again have access to at least a majority of the voting files. New nodes may be permitted to join or previously failed nodes may be rejoined that have recovered and satisfy the quorum rules.

In some implementations, revised quorum rules may apply post recovery after the expiration time period. For example, the revised quorum rules may dynamically reduce a number of required voting files for access, e.g. if one or more voting files have gone off line or if some failed nodes are not repairable and the survived nodes (e.g. majority of nodes) become a permanent revised cluster. In the case of revised quorum rules, all nodes of the cluster follows the same rules going forward. In some implementations, the expiration time period may be extended, for example if repairs to the cluster may take longer than the expiration time period.

Some quorum rules of other systems may not provide sufficient flexibility in handling disruptive events. These restrictive types of quorum rules can result in a computer cluster collapsing, despite some nodes maintaining full or partial communication capabilities. For example, computer clusters that are governed by quorum rules that narrowly require a majority of nodes to survive a disruptive event, are susceptible to total cluster failure and dismantling of an otherwise viable computer cluster. Similarly, computer clusters that require each node to be in direct communication with voting files can result in an entire cluster failing, even if some nodes can communication with each other.

The present recovery quorum rules adapt to altered node configurations due to disruptive events by permitting any number of remaining nodes to maintain the cluster, such as less than a majority of nodes as long as the less than majority remaining nodes meet communication parameters with a majority of voting files. In addition, a loss of direct access to the voting files by one or more nodes in the cluster does not necessarily require that these nodes be removed from the cluster, so long as affected nodes are able to communicate with other nodes in the cluster, or is part of a majority-group of nodes in a subset.

In illustration of a usage example of a fail-over cluster 100, according to one implementation shown in FIG. 1, client device 102 of a user 104 accesses the fail-over cluster 100 to perform various sales related tasks, such as inventory, shipping, tracking orders, order fulfillment, etc. The fail-over cluster 100 includes node1 110 and node2 112 that transmit and receive heartbeat 154 signals from/to each other through heartbeat interface 120. For simplicity FIG. 1 shows two nodes. However, any convenient number of nodes that meet quorum rules requirements may be included in the fail-over cluster 100.

In some implementations, each node may be associated with a unique identifier, such as number, device name, address on the network, etc. The nodes of the fail-over cluster may identify other nodes of the cluster by the unique identifier, such as an identical running set list maintained on each node. In some implementations, external resources, e.g., devices outside of the fail-over cluster, may also be provided with the list of unique identifiers for the nodes in the fail-over cluster.

Each node may have a cluster manager 128 including software functionality for intercommunicating with other nodes and the voting file systems. The cluster manager 128 may conduct various tasks, such as managing distribution of processes among the nodes, monitoring heartbeat performance, ensuring conformance with adaptive quorum rules, etc. The cluster manager 128 may carry out the adaptive quorum rules to determine node membership. The cluster manager 128 of each node has software functionality that executes the adaptive quorum rules in the same manner and with the same result.

For the purposes of the present discussion, software functionality may be any function, capability, or feature, e.g., stored or arranged data, that is provided via computer code, i.e., software. Generally, software functionality may be accessible via use of a user interface and accompanying user interface controls and features. Software functionality may include actions, such as retrieving data pertaining to a computing object (e.g., an object associated with a transaction); performing a task, such as determining and maintaining a running set list, performing searches, and so on.

Voting file systems 140 store the voting files 142 that include the adaptive quorum rules. In some implementations, the nodes may access the voting files 142 by way of a system providing access to the voting file systems 140, such as a storage area network (SAN), network attached storage (NAS) using a network file system protocol (NFS), Infiniband, etc.

In the usage example in FIG. 1, a client device 102 may initiate use of the fail-over cluster 100 that hosts sales database 130, by the client device 102 sending a request to a user process 122 of node2 112 to make a connection. The client device may send a connect descriptor to one or more of the nodes, for example, "abcusr@scan_name:1234/webapp". Each node1 110 and node2 112 includes a local listener 116, single cluster access name (SCAN) listener 114, and LREG 118. The LREG 118 may register the database services with the local listeners 116 and with each SCAN listener114. The client may connect to the SCAN listener 114 by entering an IP address. Through use of a SCAN name, a new node with new services can be added transparently and node configurations may change, e.g. due to the disruptive event 150, without having to change the SCAN name.

Node1 110 and node2 112 may include an instance offering webapp services, sales 1 124 and sales2 126. The SCAN listener may compare workloads of the instances sales1 124 and sales2 126 and the workloads of the nodes on which they run. If the SCAN listener 114 determines, for example, that node2112 is less loaded than node1 110, then the SCAN listener 114 selects node2 and sends the address for the local listener 116 on that node back to the client device 102. Client device 102 is assigned to a particular node, such as node2 112 as shown in FIG. 1. The client device 102 connects to the local listener 116 on node2 112. The local listener 116 starts a dedicated server process for the connection to the database. The client device 102 can connect directly to the dedicated server process on node2 112 and accesses the sales2 database 126 instance.

In the usage example, node1 110 experiences a disruptive event 150 resulting in damage 152 in which heartbeat 154 communication with node2 112 is lost. Node2 112 detects a failure status of node1 110 by the interruption of received heartbeat signals from node 1 110. The damage 152 from disruptive event 150, also includes node1 110 losing access to a voting file system 140, leaving node1 110 with an ability to access one of the three voting file systems 140. According to the adaptive quorum rules 142, node1 110 is dropped from the cluster and node2 112 is maintained in the cluster to provide services to client device 102. The user 104 of client device 102 continues use of the fail-over cluster 100 with little or no interruption of services. In other situations where node2 112 fails and node1 110 is maintained, the fail-over cluster 100 may reassign the client device 102 to node1 110.

For simplicity, a single client device 102 is shown in FIG. 1. The fail-over cluster 100 offers scaling capabilities for numerous nodes to concurrently serve many users. Additional client devices may connect to the fail-over cluster 100 in ways similar to the client device 102.

The present fail-over cluster 100 may be applied as a database tier in a multi-tier architecture system. In some implementations, the fail-over cluster may include multiple nodes that support a single database instance, e.g. sales database 130. A system may include a client device 102 as a bottom tier, a middle application tier, and a top database tier that includes the fail-over cluster 100. The fail-over cluster may contain one or more servers that store and manage data used by the multi-tier system. The data may include various types of files in which tables, indexes, other data objects, and database executables. For example, a user may initiate and action, e.g. by entering data into a form or field or activating a button on a user interface. Data may be passed to a server on an application tier. The database tier may be contacted to employ the fail-over cluster to retrieve data, e.g. data not cached in the application tier, or for data-intensive processing. Should the fail-over cluster crash, data, such as a customer's bank account information in a banking services context, may not be retrieved, and/or processes may not be able to be implemented.

Figure 2A:
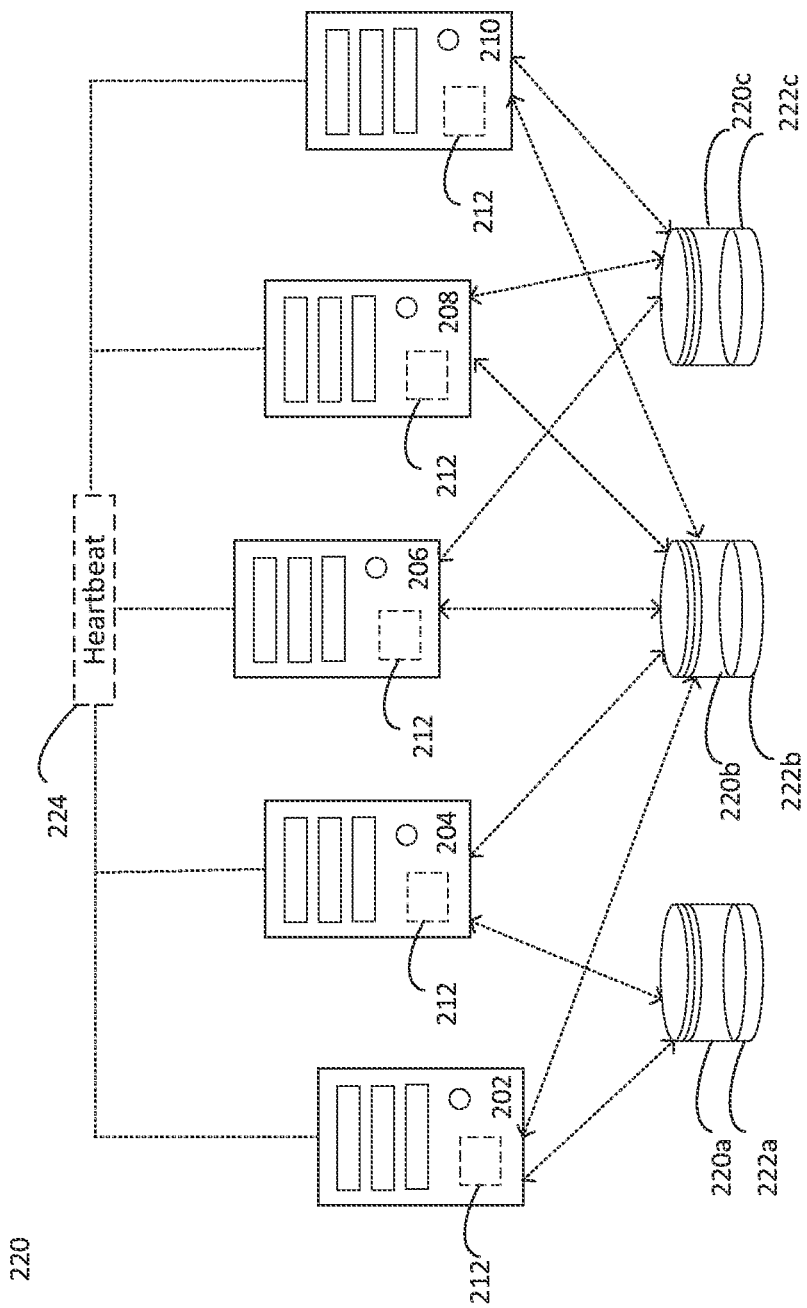

FIG. 2a shows an exemplary fail-over cluster 200 having a node configuration of five nodes 202, 204, 206, 208, and 210 with each node being in heartbeat communication 224 with the other nodes prior to a disruptive event. The nodes 202, 204, 206, 208, and 210 are considered initial nodes in that they exist while the fail-over cluster 200 remains healthy prior to an occurrence of a disruptive event, e.g. the nodes initiated at the formation of the cluster and the running set of nodes that operate thereafter before an unplanned node failure. Each of the nodes 202, 204, 206, 208, and 210 has direct access to at least a majority of three voting file systems 220a, 220b, and 220c containing voting files 222a, 222b, and 222c, respectively. Each voting file 222a, 222b, and 222c includes identical adaptive quorum rules.

Often, multiple voting file systems, such as three to five voting file systems, are included in the fail-over cluster to prevent a failed voting file system from becoming a single point of failure for the fail-over cluster. Each voting file system retains a redundant copy of the voting files. Each voting file is an independent storage device that does not share components with the other voting files in the cluster.

The nodes include cluster manager 212 as a software component that enables the nodes to operate together as if they are one node, e.g. server, to applications and the user. The cluster manager 212 may manage cluster resources, such as a database, instance, service, listener, virtual IP (VIP) address, application process, etc.

Figure 2B:
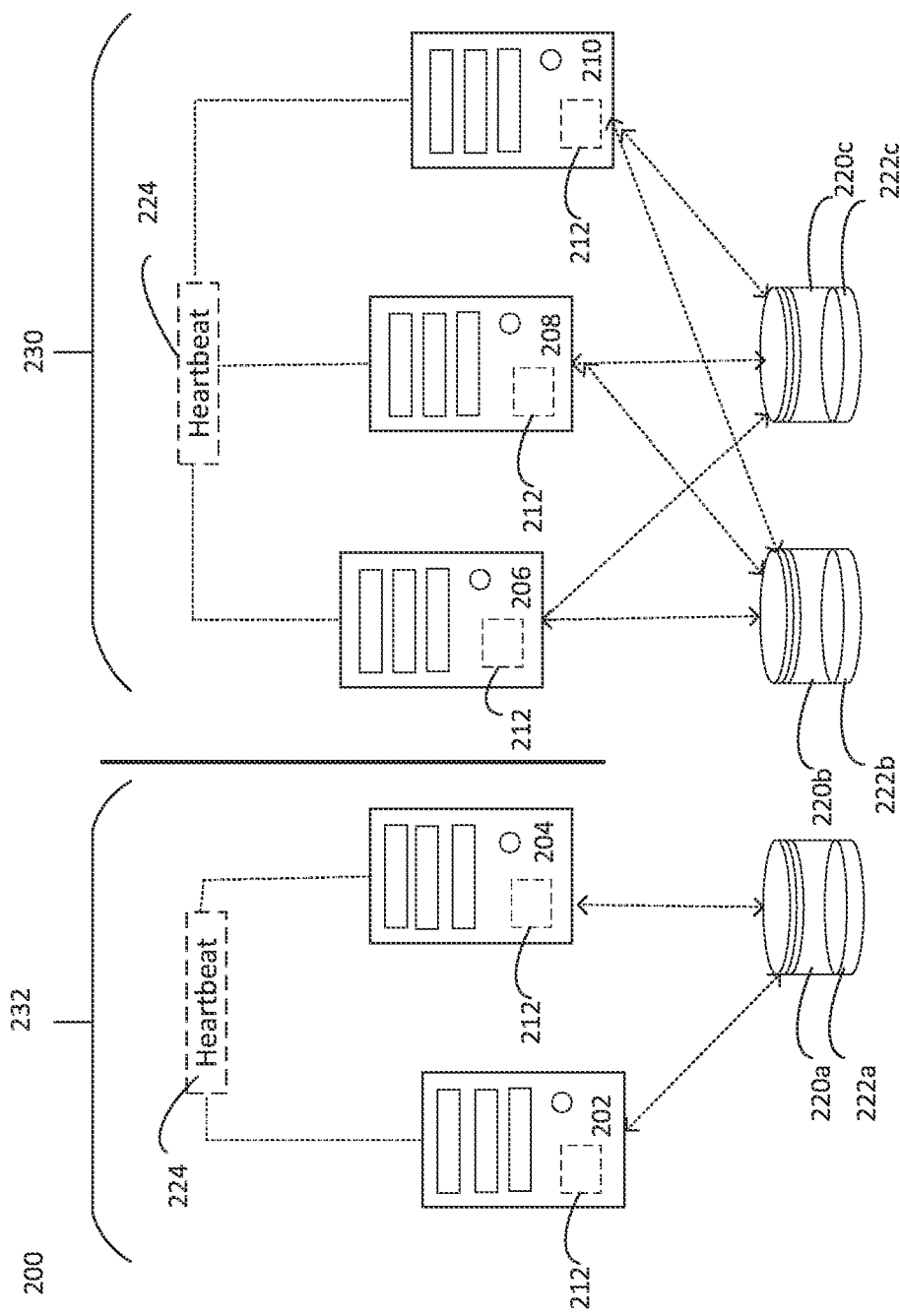

FIG. 2b shows an exemplary node configuration of the fail-over cluster 200 of FIG. 2a, which has been altered as a result of a disruptive event. The altered configuration includes one subset 232 having members of the initial nodes: node 202 and node 204. Another subset 230 has members of the initial nodes: node 206, node 208, and node 210. Nodes 202 and 204 continue to transmit heartbeat signals 224 to each other but are unable to send heartbeat signals to nodes 206, 208, and 210. Node 206, node 208, and node 210 recognize the lack of heartbeat signals arriving from nodes 202 and 204, such as via cluster manager 212, and assume that nodes 202 and 204 have crashed. Nodes 206 208, and 210 in subset 230 continue to monitor heartbeat signals 224 received from each other.

As a result of the disruptive event, nodes 202 and 204 of subset 232 further lose access to all but one of the three voting file systems, such that nodes 202 and 204 are capable of accessing voting file system 220a but are unable to access voting file system 220b and voting file system 220c. Nodes 206, 208, and 210 in subset 230 continue the same access to two of the three voting file systems 220a, 220b, and 220c, as they had prior to the disruptive event.

A loss of heartbeat detection between the nodes of subsets 230 and 232 may trigger recovery quorum rules of the set of adaptive quorum rules to be applied by the cluster manager 212. The recovery quorum rules, stored in the voting files, 222a, 222b, and 222c, address which subset 230 or 232 continues in the fail-over cluster 200. Subset 230 is a majority-group of more than half of the initial nodes. According to the recovery quorum rules, preference may be given to a subset that is a includes majority-group of the initial nodes from FIG. 2a, without regard to access to the voting files by the nodes of the majority-group subset. In FIG. 2b, subset 230 may be continued as a survived subset having the running set of nodes for the fail-over cluster 200. Each of nodes 206, 208, and 210 recognize the same running set of nodes under the identical adaptive quorum rules.

Figure 2C:
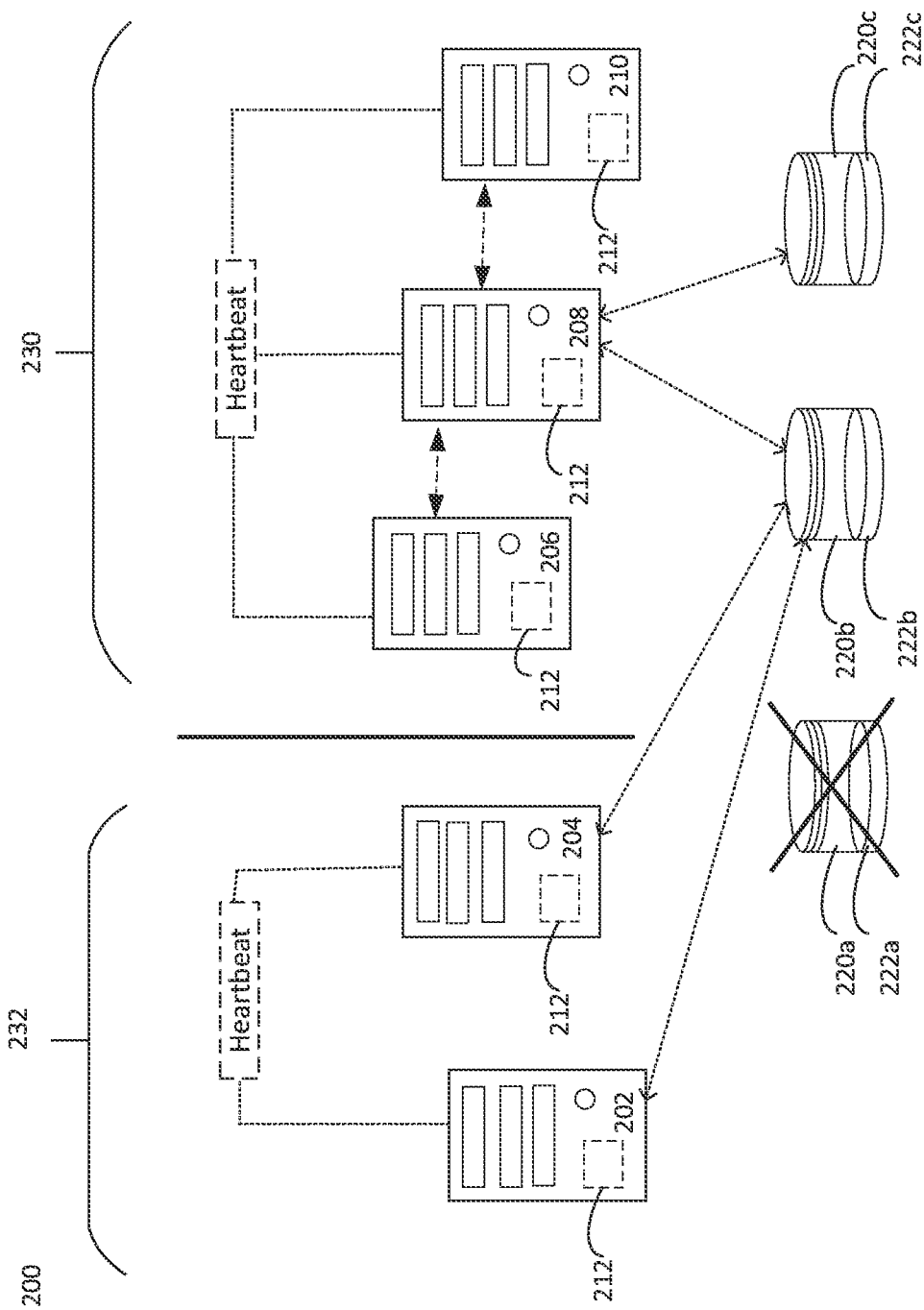

FIG. 2c shows another exemplary node configuration of the fail-over cluster 200 of FIG. 2a after the disruptive event in which indirect voting file access is achieved. The altered configuration includes one subset 232 having members of the initial nodes: node 202 and node 204. Another subset 230 has members of the initial nodes: node 206, node 208, and node 210. As a result of the disruptive event, nodes 202 and 204 are unable to send heartbeat signals to nodes 206, 208, and 210.

As a further result of the disruptive event, there is an outage of voting file system 220a with voting file 222a. None of the nodes are able to access voting file system 220a. Subset 232 nodes can still access voting file system 220b. Node 208 of subset 230 can directly access voting file systems 220b and 220c, but nodes 206 and 210 are unable to directly access any of the voting file systems. The remaining voting file systems 220b and 220c include duplicate voting files and can maintain operation of the cluster.

Node 206, node 208, and node 210 recognize the lack of heartbeat signals arriving from nodes 202 and 204, such as via cluster manager 212. The recovery quorum rules of the set of adaptive quorum rules are triggered to determine which of subset 230 and 232 will continue to maintain operation of the fail-over cluster 200. Subset 230 includes a majority-group of nodes from the initial nodes and a greater number of nodes than subset 232. Preference is to the majority-group subset 230 In FIG. 2c, node 208 directly accesses two of the three voting file systems, voting file systems 220b and 220c, which constitutes a majority of the initial voting file systems. In addition, nodes 206 and 210 have direct communication with coordinator node 208. Even if subset 230 was not a majority-group subset (if it were to include a less than a majority-group), subset 230 may be continued as the survived subset in the fail-over cluster 200 due to its voting file system access. In some implementations, one or more application processes that were running on the failed nodes 202 and 204 may be programmed to run on survived nodes 206, 208, and/or 210.

Figure 3A:
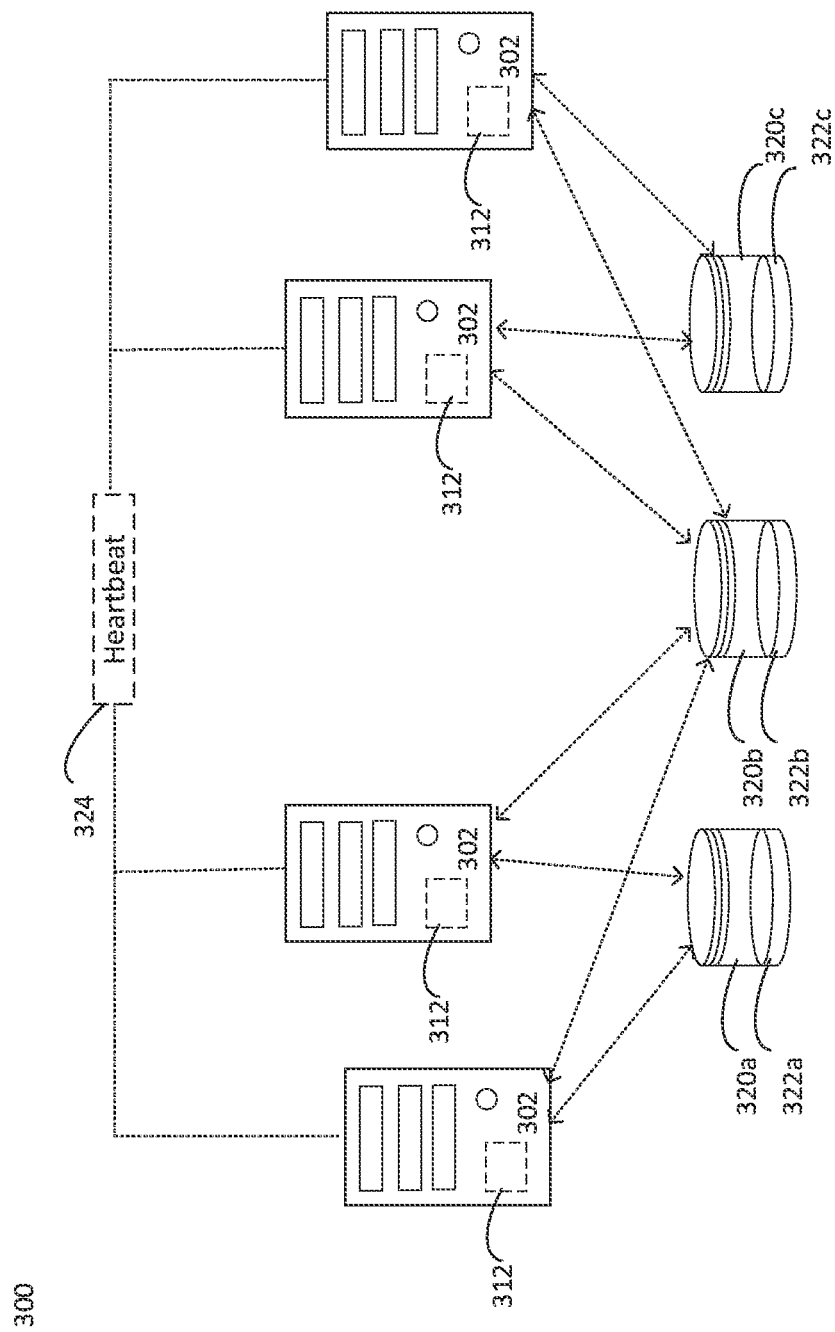

FIG. 3a shows an exemplary fail-over cluster 300 having a node configuration of four nodes 302, 304, 306, and 308 having cluster manager 312. Each node being in heartbeat communication 324. Each of nodes 302, 304, 306, and 308 have direct access to two of three voting file systems 320a, 320b, and 320c storing voting files 322a, 322b, and 322c, respectively.

Figure 3B:
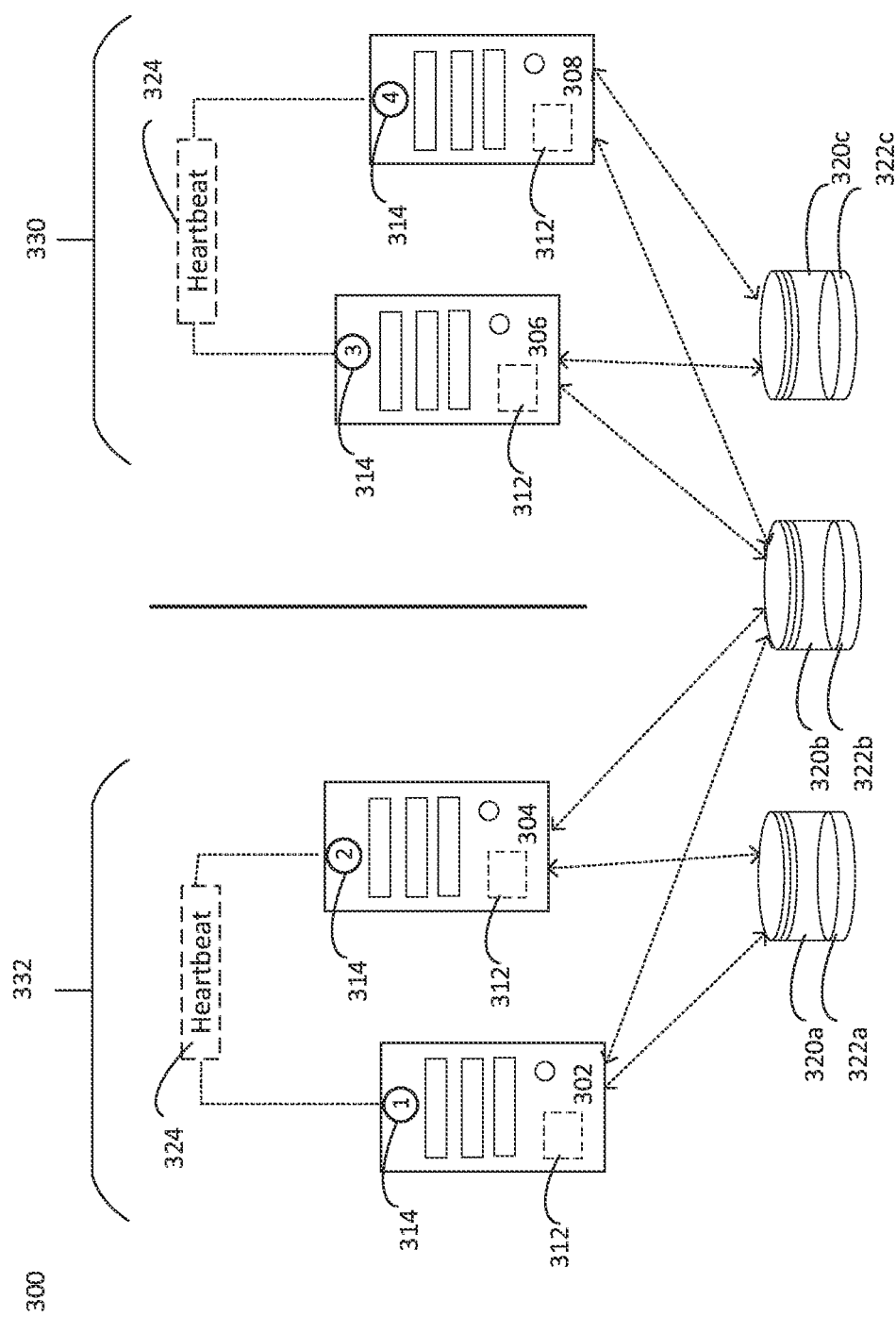

In one example shown in in FIG. 3b, the fail-over cluster 300 of FIG. 3a experiences a disruptive event and reconfiguration, in which communications between subsets of nodes have been altered as a result of the disruptive event. The altered configuration includes a partitioned subset 332 having members of the initial nodes: node 302 and node 304. Another partitioned subset 330 has members of the initial nodes: node 206 and node 208. Since both subsets 330 and 332 are groups of a half (two nodes in each subset) of the initial nodes (four total), there is no majority-group subset. In this case, the recovery quorum rules do not provide preference to one of the subsets 330 and 332 based on a majority number of remaining nodes in each subset.

Each subset 330 and 332 satisfies voting file access rules by having access to two of the three voting file system 320*a* with voting file 322*a*, voting file system 320*b* with voting file 322*b*, and voting file system 320*c* with voting file 322*c*. Since recovery quorum rules for voting file access are met by both subsets 330 and 332 and neither subset is preferred as having a majority of remaining from the initial nodes, the cluster manager 312 may apply one or more selection factors of the recovery quorum rules to break the tie. The selection factors may be used, e.g. in heuristic algorithms, by the cluster manager 312 to assist in identifying which cluster 330 and 332 will continue in the fail-over cluster 300.

Selection factors may include member size in which a subset that has a greatest number of remaining nodes may be selected to continue. The number of remaining nodes of each subset may be determined and compared to the number of remaining nodes of other subsets under consideration. In the example shown in FIG. 3*b*, each subset 330 and 332 has an equal number of two nodes. In this example, a member size factor would not be a determining factor to select a surviving subset.

Another selection factor may include a highest or lowest total of assigned identification numbers 314 of the nodes in each subset under consideration. Each node of a fail-over cluster may be assigned an identification number, for example, at the time of cluster formation or the point that a node joins a cluster. Each node may be aware of the assigned identification numbers of the other nodes in the fail-over cluster. The assigned identification numbers 314 of each node of each subset under consideration may be added and the totals compared. In some implementations, the subset associated with a highest or lowest total assigned identification number may be identified to continue with the cluster. In the example shown in FIG. 3*b*, subset 330 has a total identification number of three (with nodes having identification numbers, 1 and 2) and subset 332 has a total identification number of seven (with nodes having identification numbers, 3 and 4). Under the identification number selection factor, subset 332 may be selected to survive in the fail-over cluster 300.

A further selection factor may provide consideration to priority tasks assigned to remaining nodes in the subsets. A particular subset that includes more remaining nodes assigned to priority tasks for the fail-over cluster may enable that particular subset to survive. A priority task may be workload that is required for a service performed by the cluster. In some implementations, a priority task may not be conveniently reassigned to another node of another subset. For example, if node 304 in FIG. 3*b* is assigned to a priority task for the service being performed by the fail-over cluster 300, subset 332 may be identified to continue in the cluster.

Another selection factor may involve any essential nodes that are members of a particular subset. An essential node may be designated at formation or joining of the cluster by the node and may be based on various criteria, including certain applications on the node, allocated tasks, designated privileges of the node, etc. A particular subset with any or more essential nodes may take priority in selecting a subset to survive.

The fail-over cluster may apply one or more selection factors in various combinations to select a subset to survive in the cluster. In some implementations, a subset that meets a particular selection factor that has primary significance, may be chosen without consideration of any other selection factors. In some implementations, selection factors may be associated with scoring values that are weighted and analyzed by heuristic algorithms. A scoring value may indicate a level of importance of a selection factor to the operation of the cluster and/or the closeness that a subset meets the selection factor. For example, a subset associated with a threshold scoring value may be considered to continue in the cluster. In this manner, subsets may be ranked based on scoring values above the threshold and a top ranking subset may be chosen to survive.

Figure 4:
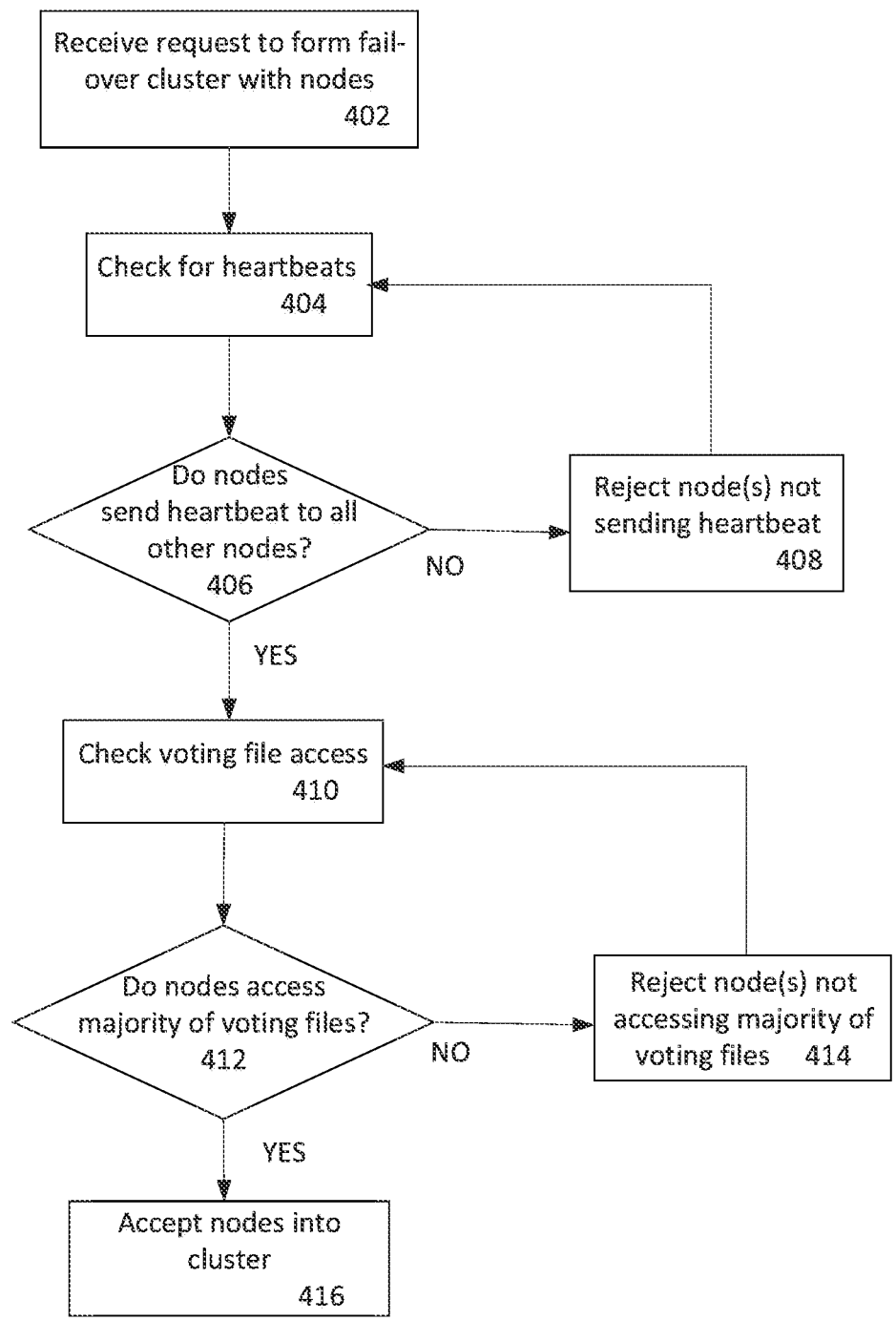
FIG. 4 is a flow diagram of an example method to form a fail-over cluster in compliance with formation quorum rules, in accordance with some implementations.

FIG. 4 shows a flow chart of a cluster creation process 400 in which nodes of the fail-over cluster (for example, 100 of FIG. 1, 200 of FIG. 2*a*, and 300 of FIG. 3*a*) complies with formation quorum rules (for example stored in voting files 222*a*, 222*b*, and 222*c* of FIG. 2*a* and 322*a*, 322*b*, and 322*c* of FIG. 3*a*). In some implementations, process 400 may be executed according to program instructions (e.g. cluster manager 128 in FIG. 1) by one or more processors of the nodes.

In block 402, a request is received, such as from a user device 102 of FIG. 1, to create the fail-over cluster. At the onset of cluster and when a new node joins an existing cluster, a node must send heartbeat signals to all other cluster nodes. In block 404 heartbeats are checked for the nodes. According to formation quorum rules, all nodes must send heartbeat signals to all of the other nodes. In decision block 406 it is determined whether each node is sending the heartbeat signal to all of the other nodes. If one or more nodes do not send the heartbeat signal, in block 408, those inactive nodes are rejected from fail-over cluster. The process returns to block 404 to monitor the heartbeats.

Where each potential node satisfies the heartbeat requirement, voting file access by each node is checked, in block 410. In decision block 412 it is determined whether each node has access to at least a majority of voting file systems storing the voting files in the cluster, in accordance with the formation quorum rules. If one or more nodes do not access at least a majority of the voting files, in block 414, the node(s) without such access are rejected from the cluster at its creation or upon a request to join as a new node. The process returns to block 410 to check for voting file access. In block 416, where each potential node satisfies the voting file access requirement, the nodes are accepted as the running set members of the fail-over cluster.

Figure 5:
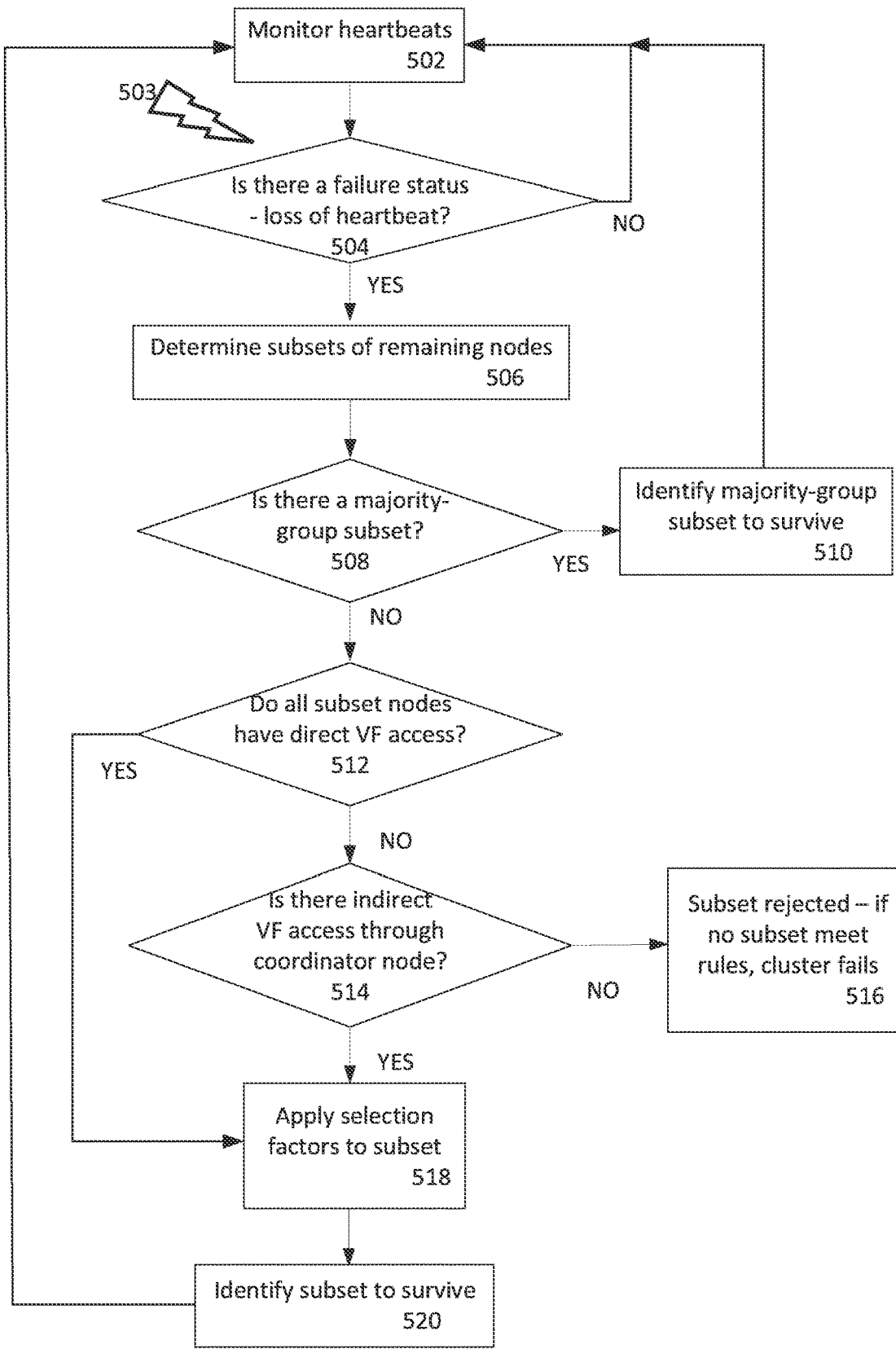
FIG. 5 is a flow diagram of an example method to maintain a fail-over cluster in compliance with recovery quorum rules, in accordance with some implementations.

FIG. 5 shows a flow chart of a cluster recovery process 500 in which nodes of the fail-over cluster (for example, 100 of FIG. 1, 200 of FIGS. 2*b* and 2*c*, and 300 of FIG. 3) comply with recovery quorum rules (for example stored in voting files 222*a*, 222*b*, and 222*c* of FIG. 2*b* and 322*a*, 322*b*, and 322*c* of FIG. 3*b*). In some implementations, process 500 may be executed according to program instructions (e.g. via cluster manager 128 in FIG. 1) by one or more processors of the nodes.

In block 502, the heartbeats sent by each potential node are monitored. According to recovery quorum rules, all nodes must send heartbeat signals to all of the other nodes. Heartbeat monitoring may be an ongoing operation of the fail-over cluster, conducted at regular intervals such as every one second. A disruptive event 503 may occur and trigger the recovery quorum rules. In decision block 504, it is determined if there is a failure status detected via a loss of heartbeat, in which any nodes fail to send heartbeat signals to all other nodes. If there is no loss of heartbeat signals, such monitoring of the heartbeat continues in block 502. If there are one or more nodes which are not sending heartbeats to some other nodes, the viable nodes that are sending heartbeat signals to each other are grouped together into respective subsets, in block 506. In some implementations, there may be a division of nodes into two or more subsets, such as individual nodes, pairs of nodes, or groups of three or more nodes.

Subsets with remaining nodes of the fail-over cluster may be individually evaluated under the recovery quorum nodes in blocks 508-520. In decision block 508 it is determined whether the nodes of a particular subset is a majority-group of the initial nodes. If the subset is a majority-group, that particular subset of nodes is identified to survive, in block 510. Thereafter, the fail-over cluster continues to block 502 in which heartbeats are monitored. If there is not a majority-group subset, the process continues to determine access to voting file systems (VF's).

In block 512, it is determined if a subset has nodes that all directly access a majority of the VF's in the fail-over cluster. If all nodes of a particular subset have direct access to a majority of VF's, the process skips to block 518 to further evaluate the subset, as described below. If not all of the nodes in a particular subset has direct VF access to a majority of the VF's, it is determined whether there is indirect access to VF by the nodes that lack direct VF access, in decision block 514. Such indirect access includes communication with one or more coordinator nodes. A coordinator node is a node in the particular subset that has direct access to a majority of VF's. If the particular subset includes nodes that lack both direct and indirect access (e.g. via a coordinator node), the subset is rejected from continuing in the fail-over cluster, in block 516. Further to block 516, should all subsets being evaluated fail to pass the direct/indirect VF access rules, the fail-over cluster may fail and its operation discontinued, at least until proper connections are restored.

If all nodes of a particular subset has either direct VF access (as determined in block 512) or indirect VF access (as determined in block 514) to satisfy voting file access rules, the particular subset is further evaluated. If the particular subset passes the VF access rules with nodes having direct or indirect VF access, the subset is evaluated under one or more selection factors, in block 518. In some implementations, where more than one subset is evaluated under selection factors, the results of the selection factors of the subsets may be compared, e.g. total scores compared. In block 520, a subset that is found that satisfies the selection factors, e.g. compared to other subsets, and that particular subset may be identified as the survived subset. The method may continue to block 502 for the fail-over cluster to be maintained and heartbeat signals monitored.

Although the steps may be presented in a specific order, this order may be changed in different particular implementations. In some particular implementations, multiple steps shown as sequential in this specification can be performed at the same time. Furthermore, additional steps may be included in the method, such as additional quorum rules may be applied to the fail-over cluster.

Methods described herein can be implemented by computer program instructions or code, which can be executed on a computer. In some implementations, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system).

Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processing units (GPUs), Application Specific Integrated Circuits (ASICs), and the like. One or more methods can be performed as part of or component of an application running on the system, or as an application or software running in conjunction with other applications and an operating system.

Figure 6:
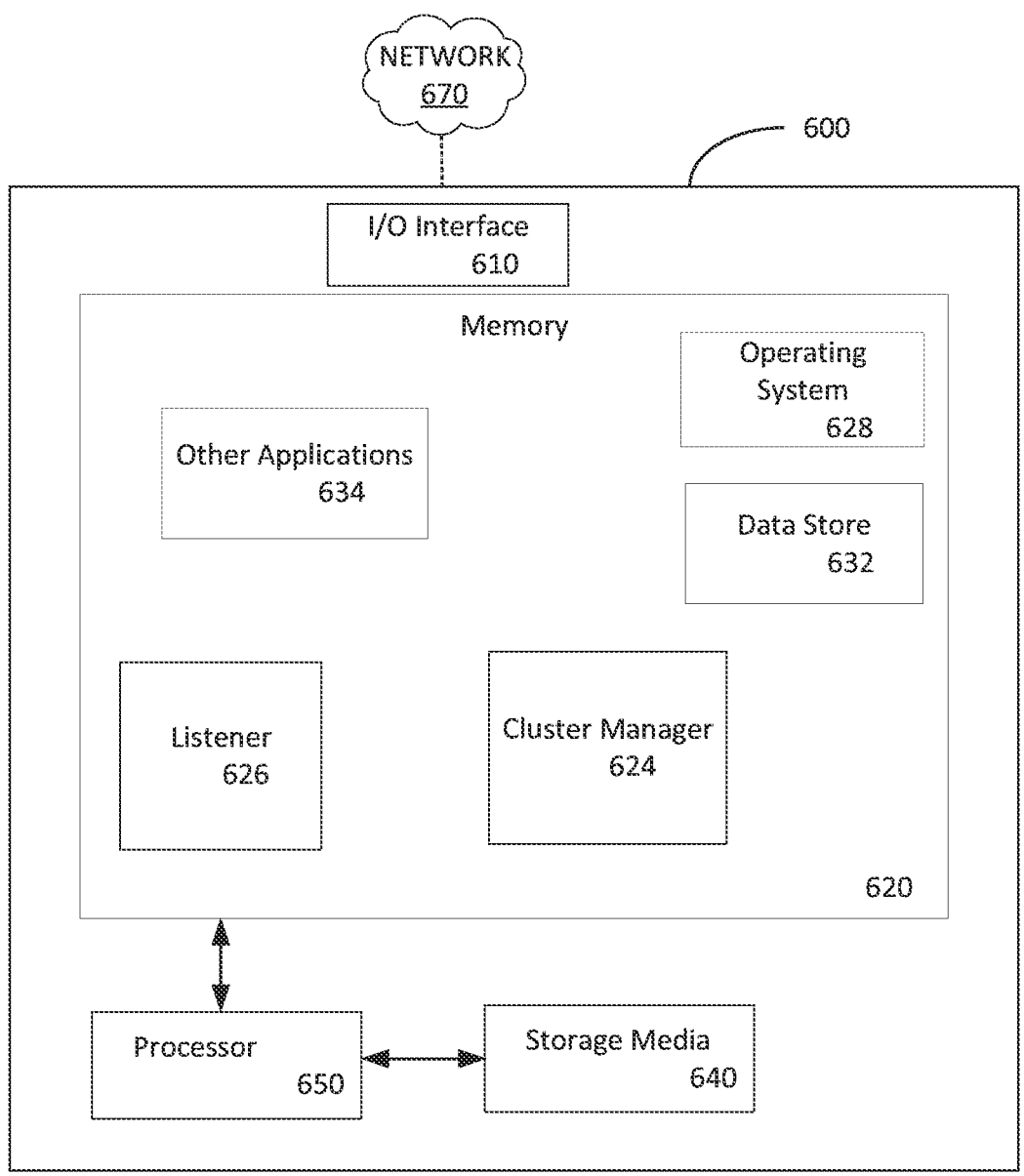
FIG. 6 is a block diagram of a computing device usable to implement in the fail-over clusters of FIGS. 1-3, in accordance with some implementations.

FIG. 6 is a block diagram of an exemplary computer device 600, e.g. a server (such as node1 110, node 2 112 in FIG. 1) for use with implementations of the fail-over cluster described herein. The computer device 600 may be included in any of the above described nodes of the fail-over cluster that processes data. Computer device 600 is merely illustrative and not intended to limit the scope of the claims. One of ordinary skill in the art would recognize other variations, modifications, and alternatives.

In one exemplary implementation, computer device 600 includes an I/O interface 610 (which may represent a combination of a variety of communication interfaces) that may include a network interface, e.g. to access voting file systems, heartbeat interface, e.g. to send and receive heartbeat signals, user input device, e.g. to communicate with a user device, etc. A network interface typically includes a network interface card, an Ethernet card, a modem (telephone, satellite, cable, ISDN), (asynchronous) digital subscriber line (DSL) unit, and the like. Further, a network interface may be physically integrated on a motherboard, or may be a software program, such as soft DSL, or the like.

Computer device 600 may also include software that enables communications of I/O interface 610 over a network 670 such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 670 may include a local area network, a wide area network, a wireless network, an Intranet, the Internet, a private network, a public network, a switched network, or any other suitable communication network, such as for example Cloud networks. Network 670 may include many interconnected computer systems and any suitable communication links such as hardwire links, optical links, satellite or other wireless communications links such as BLUETOOTH, WIFI, wave propagation links, or any other suitable mechanisms for communication of information. For example, network 670 may communicate to one or more mobile wireless devices 956A-N, such as mobile phones, tablets, and the like, via a base station such as a wireless transceiver.

Computer device 600 typically includes familiar computer components such as a processor 650, and memory storage devices, such as a memory 620, e.g., random access memory (RAM), storage media 640. A bus may interconnect computer components. In some implementations, computer device 600 is a server having hard drive(s) (e.g. SCSI) and controller card, server supported processors, network interface, memory, and the like. While a computer is shown, it will be readily apparent to one of ordinary skill in the art that many other hardware and software configurations are suitable for use with the present invention.

Memory 620 and storage media 640 are examples of tangible non-transitory computer readable media for storage of data, audio/video files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 632 may be employed to store various data such as heuristic data regarding selection factors for evaluating node subsets.

One or more computer programs, such as cluster manager 624 (e.g. cluster manager 128 in FIG. 1), listener(s) 626 (e.g. SCAN listener 114 and local listener 116 in FIG. 1), and other applications 634, also referred to as programs, software, software applications or code, may also contain instructions that, when executed, perform one or more methods, such as those described herein. The computer program may be tangibly embodied in an information carrier such as computer or machine readable medium, for example, the memory 620, storage device or memory on processor 650. A machine readable medium is any computer program product, apparatus or device used to provide machine instructions or data to a programmable processor.

Computer device 600 further includes operating system 628. Any operating system 628, e.g. server OS, that is supports the fail-over cluster may be employed, e.g. Linux, Windows Server, Mac OS, etc.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method to operate a computer cluster having a plurality of nodes according to quorum rules, the method comprising:

prior to a disruptive event, the computer cluster operates according to formation quorum rules in which each initial node that operates in the computer cluster is in communication with at least a majority of one or more voting file systems;

determining a failure status of at least one of the plurality of nodes of the computer cluster in response to a disruptive event; and maintaining the computer cluster according to at least one recovery quorum rule for an expiration time, under which a subset of remaining nodes operates, after which the formation quorum rules or revised quorum rules apply instead of the recovery quorum rules, wherein the at least one recovery quorum rule is different from the formation quorum rules and the revised quorum rules.

2. The computer-implemented method of claim 1, wherein the expiration time is extendable based, at least in part, on an additional time to address a result of the disruptive event.

3. The computer-implemented method of claim 1, wherein the at least one recovery quorum rule includes a rule that when a subset of remaining nodes include a majority group of the initial nodes, then the majority group of nodes become a survived subset to continue the computer cluster.

4. The computer-implemented method of claim 1, wherein the at least one recovery quorum rule includes a rule that when there is not a subset with a majority-group of nodes from the initial nodes, a subset is continued if all its remaining nodes have direct access or indirect access at least a majority of one or more voting file systems.

5. The computer-implemented method of claim 1, further comprising:
applying at least one tie breaker rule in addition to the at least one recovery quorum rule prior to the expiration time.

6. The computer-implemented method of claim 5, wherein the at least one tie breaker rule includes at least one of:
a greater number of remaining nodes are in a particular subset, than remaining nodes of other subsets, or
a highest or lowest total assigned identification number for the particular subset, than total assigned identification numbers of other subsets.

7. The computer-implemented method of claim 5, wherein the at least one tie breaker rule includes at least one of:
a greatest number of remaining nodes in a particular subset are associated with priority tasks, or
at least one remaining node in the particular subset is pre-designated as an essential node.

8. An apparatus to operate a computer cluster having a plurality of nodes according to quorum rules, the apparatus comprising:
one or more processors; and
one or more non-transitory computer-readable media with logic encoded thereon, the one or more processors executing the logic to perform operations comprising:
prior to a disruptive event, the computer cluster operates according to formation quorum rules in which each initial node that operates in the computer cluster is in communication with at least a majority of one or more voting file systems;
determining a failure status of at least one of the plurality of nodes of the computer cluster in response to a disruptive event; and
maintaining the computer cluster according to at least one recovery quorum rule for an expiration time, under which a subset of remaining nodes operates, after which the formation quorum rules or revised quorum rules apply instead of the recovery quorum rules,
wherein the at least one recovery quorum rule is different from the formation quorum rules and the revised quorum rules.

9. The apparatus of claim 8, wherein the expiration time is extendable based, at least in part, on an additional time to address a result of the disruptive event.

10. The apparatus of claim 8, wherein the at least one recovery quorum rule includes a rule that when a subset of remaining nodes include a majority group of the initial nodes, then the majority group of nodes become a survived subset to continue the computer cluster.

11. The apparatus of claim 8, wherein the at least one recovery quorum rule includes a rule that when there is not a subset with a majority group of nodes from the initial nodes, a subset is continued if all its remaining nodes have direct access or indirect access to at least a majority of one or more voting file systems.

12. The apparatus of claim 8, wherein the operations further comprise:
applying at least one tie breaker rule in addition to the at least one recovery quorum rule prior to the expiration time.

13. The apparatus of claim 12, wherein the at least one tie breaker rule includes at least one of:
a greater number of remaining nodes are in a particular subset, than remaining nodes of other subsets, or
a highest or lowest total assigned identification number for the particular subset, than total assigned identification numbers of other subsets.

14. The apparatus of claim 12, wherein the at least one tie breaker rule includes at least one of:
a greatest number of remaining nodes in a particular subset are associated with priority tasks, or
at least one remaining node in the particular subset is pre-designated as an essential node.

15. A non-transitory computer-readable storage medium carrying program instructions thereon to operate a computer cluster having a plurality of nodes according to quorum rules, the instructions when executed by one or more processors cause the one or more processors to perform operations comprising:
prior to a disruptive event, the computer cluster operates according to formation quorum rules in which each initial node that operates in the computer cluster is in communication with at least a majority of one or more voting file systems;
determining a failure status of at least one of the plurality of nodes of the computer cluster in response to a disruptive event; and
maintaining the computer cluster according to at least one recovery quorum rule for an expiration time, under which a subset of remaining nodes operates, after which the formation quorum rules or revised quorum rules apply instead of the recovery quorum rules,
wherein the at least one recovery quorum rule is different from the formation quorum rules and the revised quorum rules.

16. The computer-readable storage medium of claim 15, wherein the expiration time is extendable based, at least in part, on an additional time to address a result of the disruptive event.

17. The computer-readable storage medium of claim 15, wherein the at least one recovery quorum rule includes a rule that when a subset of remaining nodes include a majority group of the initial nodes, then the majority group of nodes become a survived subset to continue the computer cluster.

18. The computer-readable storage medium of claim 15, wherein the at least one recovery quorum rule includes a rule that when there is not a subset with a majority group of nodes from the initial nodes, a subset is continued if all its remaining nodes have direct access or indirect access at least a majority of one or more voting file systems.

19. The computer-readable storage medium of claim 15, wherein the operations further comprise:

applying at least one tie breaker rule in addition to the at least one recovery quorum rule prior to the expiration time.

20. The computer-readable storage medium of claim 19, wherein the at least one tie breaker rule includes at least one of:
   a greater number of remaining nodes are in a particular subset, than remaining nodes of other subsets,
   a highest or lowest total assigned identification number for the particular subset, than total assigned identification numbers of other subsets
   a greatest number of remaining nodes in a particular subset are associated with priority tasks, or
   at least one remaining node in the particular subset is pre-designated as an essential node.

* * * * *